United States Patent [19]

Aquino et al.

[11] Patent Number: 4,739,955
[45] Date of Patent: Apr. 26, 1988

[54] AIRCRAFT CABIN PANEL AND INSULATION RETAINER WITH INTEGRATED USE AS A SPACER-ISOLATOR

[75] Inventers: Roberto C. Aquino, Renton; Anthony I. C. Kirk, Issaquah; Thomas E. A. H. Webb, Bellevue; John C. Starling, Redmond, all of Wash.

[73] Assignee: The Boeing Company, Seattle, Wash.

[21] Appl. No.: 913,522

[22] Filed: Sep. 30, 1986

[51] Int. Cl.⁴ ............................................. B64C 1/14
[52] U.S. Cl. ................................... 244/129.4; 49/34; 49/465; 160/88; 52/507
[58] Field of Search ............... 244/117 R, 119, 129.1, 244/129.4, 129.5, 118.5; 52/222, 407; 49/501, 463, 34, 503, 40, 465; 160/87, 88, 352

[56] References Cited

U.S. PATENT DOCUMENTS

| | | | |
|---|---|---|---|
| 1,637,018 | 7/1927 | Bayley | 49/34 |
| 1,921,051 | 8/1933 | Trauf | 49/465 |
| 2,009,132 | 7/1935 | Gehris | 49/465 |
| 2,256,961 | 9/1941 | Pearson et al. | 52/407 |
| 2,263,919 | 11/1941 | Darragh, Jr. | 52/407 |
| 2,476,451 | 7/1949 | Murphy et al. | 52/222 |
| 3,325,951 | 6/1967 | Johnson | 49/34 |
| 4,637,188 | 1/1987 | Crothers | 52/407 |

FOREIGN PATENT DOCUMENTS 2561691 9/1985 France .
22162 10/1961 German Democratic Rep. .

Primary Examiner—Galen Barefoot
Attorney, Agent, or Firm—Hughes, Cassidy & Multer

[57] ABSTRACT

A mounting assembly for the insulation and interior panels of an aircraft. The mounting assembly includes an upper retainer for securing the upper edge of the cabin panel to the aircraft, and a lower releasable latch assembly which connects the lower end of the cabin panel to the aircraft. The curved aircraft panels, which are made of a resilient bendable material, are installed so that the panels are further resiliently bent into a tensioned state which acts to resiliently engage the panels between the upper retainer and the lower latch assembly. A shock absorber and insulation retainer is attached to the aircraft between the aircraft frame and the cabin panel to prevent vibration of the cabin panel and to secure the insulation between the aircraft panel and the aircraft frame.

20 Claims, 4 Drawing Sheets

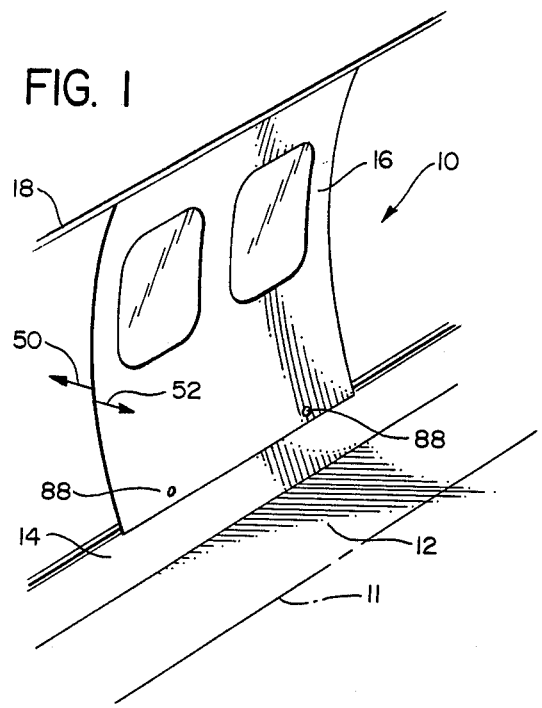
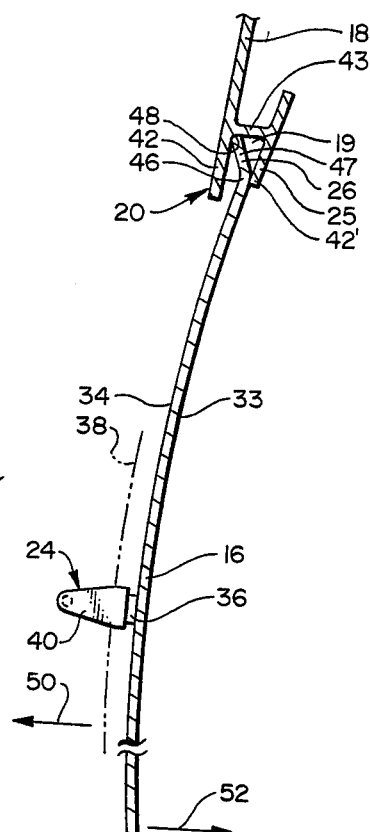
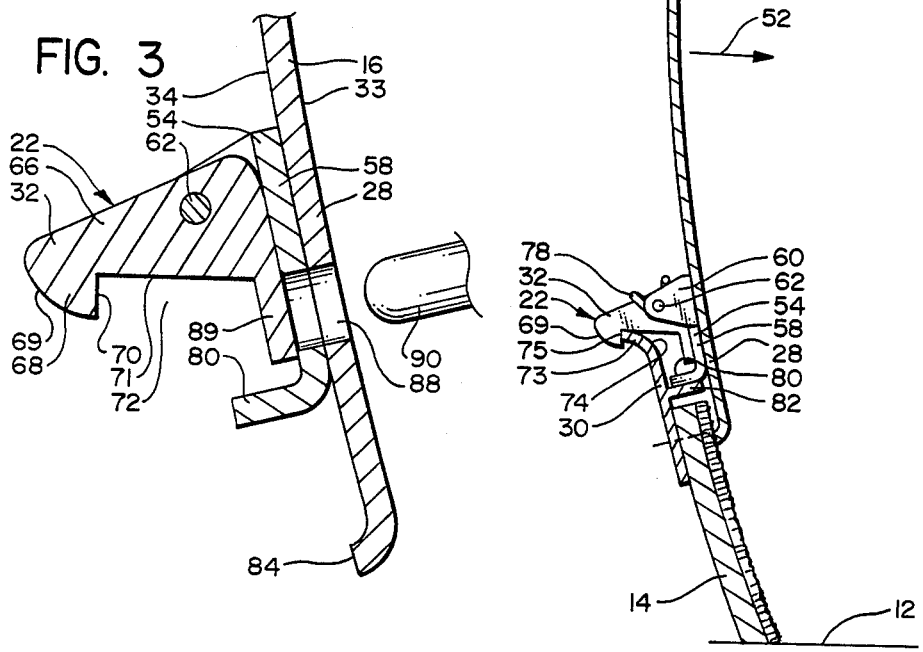

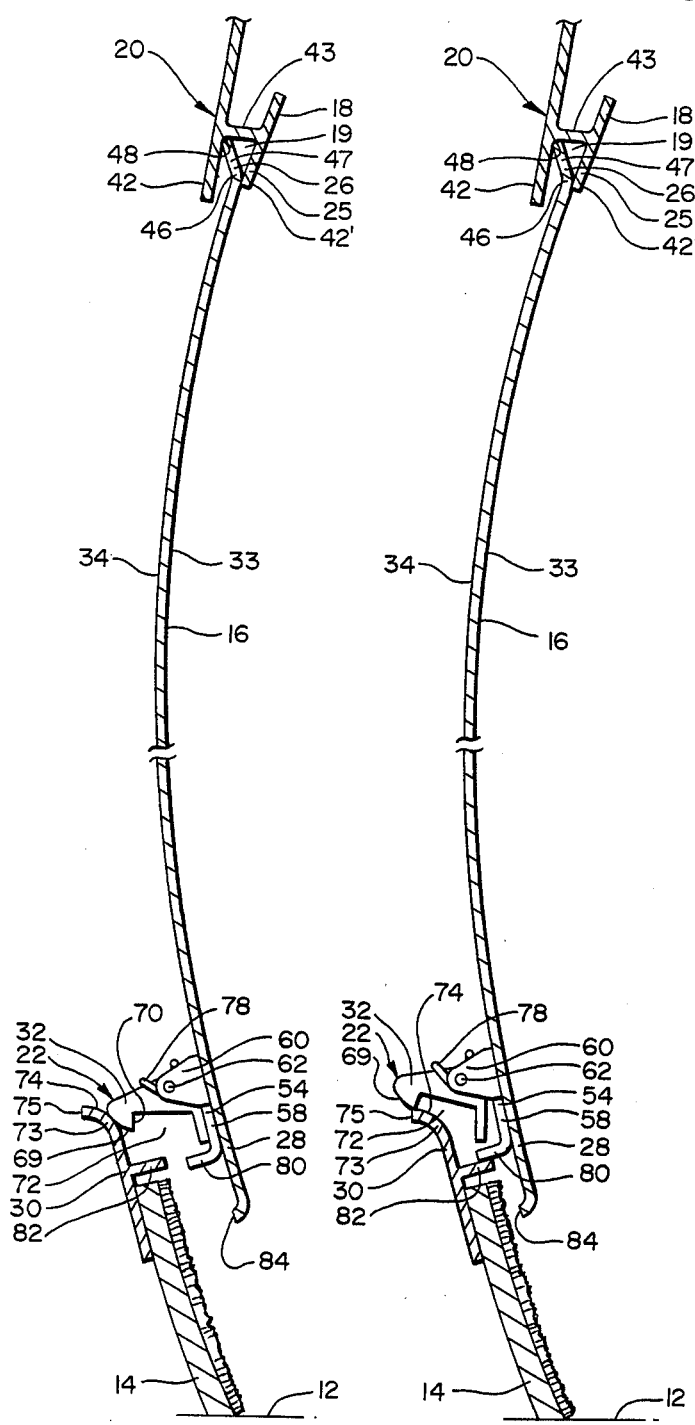

AIRCRAFT CABIN PANEL AND INSULATION RETAINER WITH INTEGRATED USE AS A SPACER-ISOLATOR

TECHNICAL FIELD

The present invention pertains to apparatus and methods for mounting aircraft cabin panels and insulation to the frame of an aircraft.

BACKGROUND OF THE INVENTION

The interior of commercial passenger aircraft are formed by a number of generally curved vertical panels which extend between the floor and stowage bin of the aircraft in a side-to-side manner along the left and right sides of the aircraft. Behind these panels is located insulation which reduces the noise and vibration transmitted from the aircraft engines to the interior of the cabin. The noise and vibration are further reduced by mounting the panels against rubber shock absorbers which are also known as "shock mounts", and which are affixed to the frame of the aircraft. It is important however, that the cabin panels be held securely against the shock mounts so that any vibration of the aircraft frame does not cause these panels to vibrate against the frame and shock mounts.

In addition to the aforementioned habitability factors of reduced noise and vibration, it is desirable that the panels and insulation be installed and removed easily and rapidly. This is true not only during the initial construction of the aircraft, but also later on when maintenance is being performed. Behind the panels there are typically located a number of air conditioning ducts as well as electrical wiring for the cabin lighting. These ducts and wiring are accessed by removing the cabin panels.

In many conventional passenger aircraft the cabin panels have tabs which extend outwardly from the vertical edges of the panels. The panels are secured by horizontal bridge fasteners which are inserted over the tabs of adjacent cabin panels and which are connected to the aircraft frame via the shock mounts by screw fasteners. A decorative vertical trim strip is inserted between the edges of the adjacent panels and over the tabs to provide a pleasing appearance to the cabin.

Behind the panels are located the shock mounts which are riveted to the frame. The shock mounts include threaded receptacles for securing the bridge fasteners to the aircraft. The insulation is installed behind the cabin panels, and is secured to the vertical ribs of the aircraft frame.

Since conventionally the shock mounts are prelocated by being riveted to the aircraft ribs prior to attaching the panels or insulation, it is sometimes difficult to properly secure the panels to the aircraft. This is because either the tabs of the adjacent panels do not properly align with each other to permit simultaneous engagement by the bridge fasteners, or because the tabs do not align with the position of the bridge fastener; the position of the bridge fastener being fixed by the location of the mounting holes in the prelocated shock mount. Furthermore, the lengthwise gap between the edges of the adjacent panels may be too small to accomodate a vertical trim strip, or the projecting screw fasteners may prevent the trim strip from being easily inserted in the gap.

Other apparatus have been disclosed for both mounting wall panels and insulation to an underlying surface. For example, in U.S. Pat. No. 2,925,050 by Candlin, Jr. et al, there is disclosed a railway car having interior panels which are removably mounted to the frame of the car by means of resilient connectors.

In U.S. Pat. No. 3,238,686 by Pomeroy, removable panels for the interior of an elevator are disclosed and which include slotted portions which fit over the head of a bolt which in turn is fixedly mounted to the elevator frame.

Various fasteners have also been disclosed for attaching members to a frame. Swain, in U.S. Pat. No. 3,303,624 discloses a rotatable fastener which is connected to a removable ceiling tile and which when rotated engages or disengages another tile mounted adjacent to the removable tile. In addition, a fastener for securing a metal frame such as for windows, to a wooden frame utilizing two levers having oppositely facing hooks which respectively engage ribs of the wooden frame is disclosed by Schmidlin in U.S. Pat. No. 3,460,306. Another fastener assembly for attaching wall panels to spaced stud members is disclosed in U.S. Pat. No. 3,722,163 by Satkin et al in which the panels have hooked members which are inserted within slots of the studs.

A fastener assembly for fastening panels to the interior of an aircraft cabin is disclosed in U.S. Pat. No. 4,050,208 by Pompei et al, which is assigned to the assignee of the present invention, and in which an interior wall and ceiling panel for an airplane includes a fastener bracket which attaches the panels to the airplane frame and permits the positions of the panels to be adjusted relative to the frame.

Other fastener assemblies include U.S. Pat. No. 4,134,244 by Sjolander which discloses a building cover panel having an outer longitudinal marginal portion which is resiliently snapped into a corresponding receptacle portion of an underlying support rail. Another fastener assembly for attaching a rigid soundproofing panel to an aircraft is disclosed by Olsen in U.S. Pat. No. 4,442,647 in which elastomeric material is used as a fastening means to reduce the transmission of vibrations between the aircraft frame and the panel. Furthermore, removable overlapping closure panels for a livestock trailer in which the panels are attached to the trailer frame by spring biased latch members which engage the panels inwardly toward the frame are disclosed by Lewis in U.S. Pat. No. 4,470,231.

Various apparatus for fastening insulation material to an underlying wall has also been disclosed. For example, in U.S. Pat. No. 2,256,961 by Pearson et al, a fastener for insulation material of a refrigerator car is disclosed which includes a barbed spear over which the insulation is inserted and a cover for the spear which holds the insulation to the spear. In U.S. Pat. No. 2,263,919 by Darragh, Jr., a fastener is disclosed for attaching an inner shell of an aircraft to an outer shell, and which includes a rubber grommet which is located between the shells and a mounting bolt which passes through the grommet to connect the shells together.

In Rosenburg, U.S. Pat. No. 3,238,835, an acoustic insulation fastener for securing insulating materials to the inside of a ship's hull includes an elongated fastener having a projecting shank and a removable support pin attached to the shank over which the insulation is placed to secure the insulation to the shank of the fastener.

Various fasteners have been disclosed for attaching refractory linings to furnace walls. These include U.S. Pat. No. 3,738,217 by Walker, in which an elongated fastener is welded to the furnace wall at one end, the opposite end having a notched configuration for receiving a complementary shaped retaining clip for securing the lining to the wall. Other patents in which similar fasteners for fastening refractory material to furnace walls includes U.S. Pat. No. 4,018,023 by Anderson; U.S. Pat. No. 4,030,261 by Coleman; U.S. Pat. No. 4,157,001 by Pickles; and U.S. Pat. No. 4,370,840 by Bisbee et al.

Other insulation fasteners include U.S. Pat. No. 3,945,158 by Simpson in which there is disclosed a fastener assembly for clamping the edge of roof insulation material to an eave strut of a metal building, the fastener including a retaining element having a Z cross-sectional configuration for securing the insulation to the roof structure and a second flexible metal strip for holding the Z-shaped retaining element in place. Furthermore, Dunlap, in U.S. Pat. No. 4,248,023, discloses an insulation assembly for the interior of a furnace including an outer housing which encloses the insulation and a T-shaped stud which is secured to the furnace wall at one end and has a pointed opposite end over which the insulation is inserted.

SUMMARY OF THE INVENTION

The present invention pertains to an aircraft having an upper structural portion and a lower structural portion, and further having resiliently bendable cabin panels. Each of the cabin panels has an upper end portion and a lower end portion, and each cabin panel occupies a first untensioned state which forms a first distance between the upper end portion and the lower end portion, and a second bent tensioned state in which the distance between the upper end portion and the lower end portion is less than the first distance. In the present invention there are apparatus for mounting the cabin panel to the upper and lower aircraft structural portions. The apparatus includes upper retaining means, which are connected to the upper structural portion, and which releasably secure the upper end portion of the cabin panel to the upper structural portion. Also included are lower retaining means for releasably securing the lower end portion of the cabin panel to the lower structural portion. The lower retaining means include engaging means which are operatively connected to the lower structural portion and which are separated from the upper retaining means by a second distance. The lower retaining means also includes latch means which are operatively connected to the lower end of the cabin panel at a third distance, which is greater than the second distance, from the upper end of the cabin panel. The latch means are operatively connected to the cabin panel lower end for movement between (i) a first position where the latch means are disengaged from the engaging means when the cabin panel is in the untensioned state, and (ii) a second position where the latch means are engaged to the engaging means and the cabin panel has formed the bended tensioned state so as to be resiliently engaged between the upper retaining means and the engaging means.

The engaging means includes a latching surface for engaging the latch means. The latch means is pivotally connected to the lower end of the cabin panel and is biased in a manner to urge the latch means into engagement with the latching surface. The latch means further includes a catch portion for engaging the latching surface when in the engaged position. The latching surface includes an upwardly extending portion which terminates in an engaging end and which guides the catch portion upwardly and into engagement with the engaging end in a manner to cause the cabin panel lower portion to move upwardly toward the cabin panel upper portion so that the cabin panel forms the bended tensioned state.

The mounting apparatus also includes means for securing insulation material between the cabin panel and an aircraft structural member. The aircraft structural member is characterized by having a first structural portion with a first substantial alignment component, and a second structural portion which extends from an end of the first structural portion and which has a substantial alignment component which is perpendicular to the first alignment component. The securing means further includes a base having a third substantial alignment component, and first and second connecting members which extend from the base, each of which has a fourth substantial alignment component which is perpendicular to the third alignment component. The securing means also includes an elongated member which extends from the first connecting member and which has a substantial alignment component which is parallel to the third alignment component. The elongated member includes a first end which extends through the aircraft first structural portion and is secured to the first structural portion by the second connecting member which engages the first end, in a manner that the base is located adjacent to the second structural portion. The first end secures a first portion of the insulation material thereon. The elongated member also includes a second end for securing a second portion of the insulation material thereon in a manner that the insulation material extends adjacent to the base and between the first and second ends of the elongated member.

The securing means also includes a first insulation material retaining member which extends from the base and which has a substantial alignment component which is perpendicular to the third alignment component. The first retaining member is releasably connected to the first end of the elongated member to secure the first portion of the insulation material to the first end between the first connecting member and the first insulation retaining member. The securing means also includes a second insulation material retaining member which extends from the base and which has a substantial alignment component which is perpendicular to the third alignment component. The second retaining member is releasably connected to the second end of the elongated member to secure the second portion of the insulation material to the second end between the first connecting member and the second retaining member.

The securing means also includes vibration dampening means which are connected to and extend from opposite sides of the base to engage the second structural portion and the cabin panel in order to prevent vibration of the cabin panel.

The present invention also pertains to an interior panel network of an aircraft having an upper structural portion and a lower structural portion. The interior panel network includes a plurality of resiliently bendable aircraft interior panels, each of which has an upper end portion and a lower end portion. Each of the panels occupies a first untensioned state which forms a first distance between the upper end portion and the lower end portion, and a second bended tensioned state in which the distance between the upper end portion and the lower end portion is less than the first distance. Also included are means for mounting each of the cabin panels to the upper and lower aircraft structural portions. The mounting means includes upper retaining means which are connected to the upper structural portion and which releasably secure the upper end portion of the cabin panel to the upper structural portion. The mounting means also includes lower retaining means for releasably securing the lower end portion of the cabin panel to the lower structural portion. The lower retaining means includes engaging means which are operatively connected to the lower structural portion and which are separated from the upper retaining means by a second distance. The lower retaining means also includes latch means which are operatively connected to the lower end of the cabin panel at a third distance, which is greater than the second distance, from the upper end of the cabin panel. The latch means are operatively connected to the cabin panel lower end for movement between a first position where the latch means are disengaged from the engaging means and the cabin panel is in the untensioned state, and a second position where the latch means are engaged to the engaging means and the cabin panel has formed the bended tensioned state so as to be resiliently engaged between the upper retaining means and the engaging means.

The aircraft interior panel network also includes a first group in which each panel of the first group includes a first upstanding planar portion having a first substantial alignment component and which has an interior surface which forms a portion of the cabin interior and which terminates at first and second spaced apart upstanding edges. Each panel of the first group also includes first and second intermediate portions, each of which has a second substantial alignment component which is perpendicular to the first alignment component and which is connected to the first and second upstanding edges, respectively. Each panel of the first group also includes first and second upstanding end portions which are connected to the first and second intermediate portions, respectively, and each of which has a substantial alignment component which is parallel to the first alignment component and which has an interior surface which also forms a portion of the cabin interior. The aircraft interior panels also include a second group in which each panel of the second group includes a third upstanding planar portion having an alignment component which is parallel to the first alignment component and which has an interior surface which forms a portion of the cabin interior and which terminates at third and fourth upstanding edges. Each panel of the second group also includes third and fourth intermediate portions, each of which has a substantial alignment component which is parallel to the second alignment component and which is connected to the first and second upstanding edges, respectively, and which terminates at fifth and sixth upstanding edges, respectively. The cabin interior is formed by the securing of the cabin panels to the aircraft structure in a manner that one of the panels of the first group is alternated with panels of the second group so that the fifth edge of one of the panels of the second roup is in engagement with the interior surface of the second end portion of one of the panels of the first group, and the sixth edge of one of the panels of the second group is in engagement with the interior surface of the first end portion of one of the panels of the first group.

The present invention also pertains to an aircraft having an upper structural portion and a lower structural portion which are separated from each other by a first vertical distance, and further having resiliently bendable cabin panels, each of which has an upper end portion and a lower end portion. Each of the cabin panels occupies a first untensioned state which forms a second vertical distance between the upper end portion and the lower end portion, and a second bended tensioned state in which the vertical distance between the upper end portion and the lower end portion is less than the first distance. The invention includes a method for engaging the aircraft cabin panels to the aircraft which includes the steps of releasably securing the upper end portion of the cabin panel to the upper structural portion of the aircraft. The method also includes the steps of releasably securing the lower end portion of the cabin panel to the lower structural portion of the aircraft by moving the lower end of the cabin panel from a first position where the lower end is disengaged from the lower structural portion and the cabin panel is in the untensioned state, to a second position where the lower end of the cabin panel is engaged to the lower structural portion. This is accomplished by moving the lower end portion of the cabin panel upwardly toward the upper end portion so that the distance between the upper end portion and the lower end portion is less than the second distance in order to form the cabin panel in the bended tensioned state so as to resiliently engage the cabin panel between the upper structural portion and the lower structural portion.

It is an object of the present invention to provide fastener assemblies for attaching removable panels and insulation to an underlying framework.

BRIEF DESCRIPTION OF THE DRAWINGS

These and other objects and advantages of the present invention will become more readily apparent upon reading the following Detailed Description and with reference to the attached Drawings, in which:

FIG. 1 is an isometric view of an exemplary interior side panel for an aircraft cabin;

FIG. 2 is a side view of the interior side panel showing the panel fastener assembly and insulation attaching assembly of the present invention;

FIG. 3 is a side sectional view of the panel fastener assembly of the present invention;

FIG. 4 is a side view similar to that of FIG. 2 and showing a disengaged position of the panel fastener assembly prior to being placed in position for engaging the aircraft structure;

FIG. 5 is a side view similar to FIG. 4 and showing the position of the panel fastener assembly between the disengaged position of FIG. 4 and the engaged position of FIG. 2;

Figure 6:
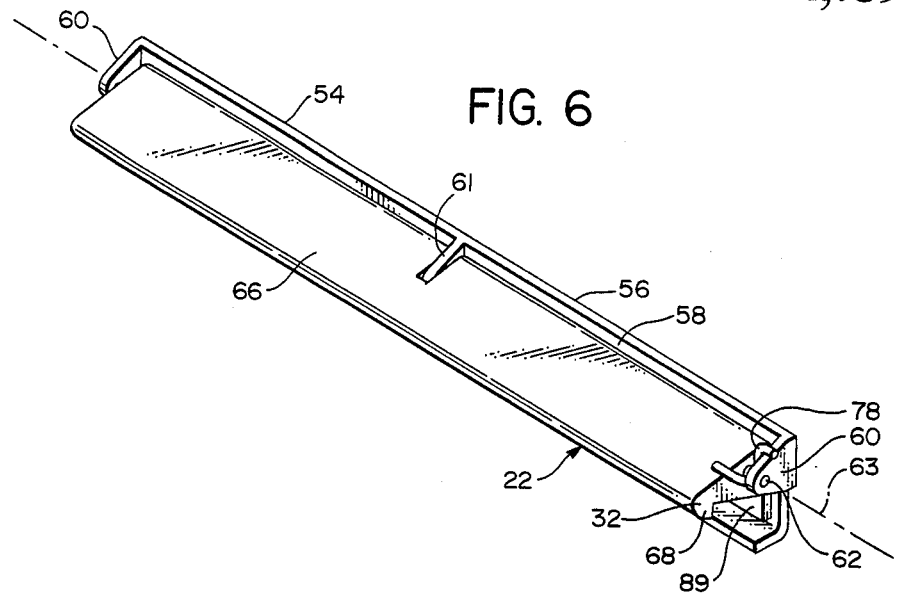
FIG. 6 is an isometric rear view of the lower panel fastener assembly of the present invention.

While the present invention is susceptible of various modifications and alternative forms, specific embodiments thereof have been shown by way of example in the Drawings and will herein be described in detail. It should be understood, however, that it is not intended to limit the invention to the particular forms disclosed, but on the contrary, the intention is to cover all modifications, equivalents and alternatives falling within the spirit and scope of the invention.

DETAILED DESCRIPTION OF THE INVENTION

The present invention pertains to a mounting assembly for the interior side panels of an aircraft cabin and for the insulation which is located between the cabin panels and the aircraft frame.

There is shown in FIG. 1 the interior of a conventional aircraft cabin generally indicated at 10, only a portion of which is shown for ease of illustration. The aircraft cabin 10 includes a lengthwise axis identified by a line 11, and further includes a floor 12 and an upwardly extending kick panel 14 which runs lengthwise along the inside of the aircraft cabin. Extending upwardly from the kick panel 14 are a number of curved cabin panels 16, only one of which is shown for ease of illustration. Cabin panels 16 are mounted between the lower kick panel 14 and an upper fixed portion 18 of the cabin structure which extends along the length of the cabin interior. The mounting of the cabin panel 16 to the aircraft is achieved by the mounting assembly of the present invention which is shown more clearly in FIGS. 2 and 3. The mounting assembly includes an upper engaging assembly indicated at 20, a lower latch assembly indicated at 22 and multiple middle shock absorbing and insulation retaining assemblies indicated at 24, which are secured to a vertically extending rib (not shown) of the airplane structure.

Briefly, the upper fixed cabin portion 18 (FIG. 2) includes an inverted U-shaped slotted member 25 (FIG. 2) for securing the upper end 26 of the cabin panel therein. In order to secure the lower end 28 of the cabin panel 16 to the aircraft, the kick panel 14 has an upwardly extending catch plate 30 which engages a spring biased latch 32 which in turn is connected to the lower end 28 of the cabin panel 16.

The cabin panel 16 is made of a conventional flexible resilient fiberglass material, also known as "crushed core". Cabin panel 16 includes an inward surface 33 and an outward surface 34; the inward surface 33 having a concave configuration when the cabin panel is in its relaxed state with no external compressive forces acting upon it. The inherent resiliency of the cabin panel 16 allows it to be resiliently engaged to the aircraft by first inserting the upper end 26 of the cabin panel within the upper slot 25 as shown in FIG. 4, and then pushing outwardly against the inner surface 33 at the lower end 28 of the cabin panel to cause the latch 32 to ride upwardly and outwardly on the catch plate 30 as shown in FIG. 5, until the latch 32 engages the catch plate 30 as shown in FIG. 2. As the latch 32 rides upwardly on the catch plate 30, the flexible cabin panel is caused to bend from its relaxed arcuate curved state shown in FIG. 5, to a more bended arcuate configuration shown in FIG. 2 in which the radius of the cabin panel is decreased. The resulting bending of the cabin panel generates both an upward force against the retaining slot 25 and a downward force against the catch plate 30, in a manner to be described further hereinafter, to secure the cabin panel in place.

Figure 8:
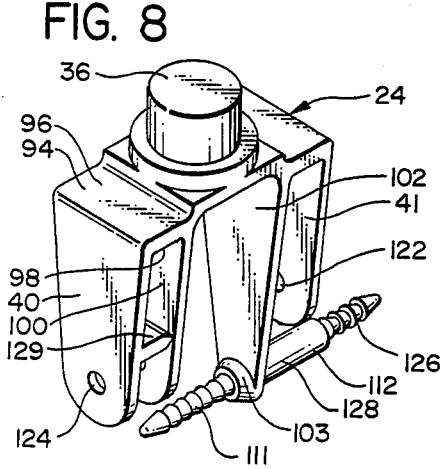
FIG. 8 is an isometric view of the insulation fastener and shock absorber assembly of the present invention.

The increased bending of the cabin panel 16 in the installed position shown in FIG. 2, causes the middle portion of the cabin panel to engage an elastomeric cushion 36 of the shock absorbing assembly 24; the assembly 24 preferably being made of a flexible plastic material. As shown more clearly in FIGS. 8 and 9, assembly 24 is connected to a vertically extending rib indicated at 38 of the aircraft and includes left and right outer flexible straps 40, 41, respectively, for securing insulation 44. In this manner, the cabin panel 16 is spaced apart from the rib 38 and cushioned against vibration.

Having briefly described the principal elements of the present invention and their function, these elements and the remaining elements of the invention will be described in greater detail. Referring first to FIG. 2, the retaining slot 25 of the upper cabin portion is formed by two spaced apart downwardly depending flanges 42 which are joined by a horizontal flange 43. Slot 25 is typically formed by conventional cabin air conditioning extrusion which extends longitudinally along the length of the aircraft cabin on the port and starboard sides of the cabin. In order to fit snuggly within the conventional retaining slot 25, which has a width dimension which is somewhat greater than the thickness dimension of the cabin panel 16, the upper portion 26 of the cabin panel extends upwardly and outwardly at a bend 46. In this manner the upper end 47 of the cabin panel 16 engages a crotch 48 formed by the inner surfaces of the flanges 42, 43, while the bend 46 engages the inward flange 42' of the retaining slot 25 so that there is no transverse movement of the cabin panel 16 within the retaining slot 25. For purposes of explanation, in the present invention an "outward" direction is shown by an arrow in FIG. 2 designated by the number 50, and which characterizes a direction from inside the cabin toward the aircraft frame, while the "inward" direction as shown by an arrow designated by the number 52, refers to a direction which is generally opposite to the outward direction.

Referring now to the lower latch assembly shown in FIGS. 2, 3 and 6, there is included a mounting bracket 54 (FIG. 6) which has an elongated rear brace 58 which in turn is fastened horizontally to the outward surface 34 of the cabin panel lower portion 28 (FIG. 2). The latch 32 is pivotally connected to the rear brace 58 by end flanges 60 and a middle flange 61 which extend outwardly from the rear brace. Latch 32 is pivotally connected to a rod 62 for movement about an axis designated by a line 63. Pivot rod 62 extends generally parallel to the aircraft longitudinal axis through the end flanges 60 and middle flange 61.

More particularly, latch 32 includes a somewhat outwardly extending nose 66 (FIG. 3) which terminates in a downwardly extending catch portion 68. The catch portion 68 is formed by a convex end surface 69 which extends downwardly and inwardly to terminate at an upwardly extending vertical surface 70. At its upper end, the vertical surface 70 joins with an inwardly extending surface 71 to form a catch recess 72.

To engage the catch recess 72, catch plate 30 (FIG. 4) includes (i) a lower portion which is fastened to the outward surface of the kick panel 14, and (ii) an upper portion 73 which curves upwardly and outwardly to form a concave riding surface 74 and which terminates at a vertically extending end surface 75.

In order to be guided over the riding surface 74 when being moved into the engaged position, catch 32 is biased in a counterclockwise direction by a spring 78 (FIG. 6) so that catch portion end surface 69 slidably engages riding surface 74. Spring 78 is made from a resilient wire-like material which is mounted around pivot shaft 62 and includes an upper arm which is resiliently engaged against the upper surface of the bracket end flange 60, and a lower arm which is resiliently engaged against the upper surface of the catch nose 66.

As mentioned previously, the cabin panel 16 is made from a honeycomb material which permits the cabin panel to be resiliently bended during installation so as to increase the curvature of the panel. In the present invention, when the cabin panel 16 is in its relaxed state (FIG. 4), the vertical distance between the end 75 of catch plate 30 and the crotch 48 of the upper retaining slot 25 is less than the vertical distance between the catch recess surface 71 and the upper end 47 of the cabin panel. However, during installation, cabin panel 16 is caused to be further bent to a tensioned state so that the panel 16 bears against both the retaining slot 25 and the catch plate 30 to secure the cabin panel firmly in place on the aircraft.

To facilitate placing the cabin panel in the bended tensioned state during installation, the upper end 26 of the cabin panel is first placed within the retaining slot 25 so that the latch 32 is below the catch plate upper end 75 (FIG. 4). An outward pressure is then exerted against the inward surface 33 of the lower portion of the cabin panel to cause the nose surface 69 of the catch 32 to ride upwardly and over the riding surface 74 of the catch plate 30 until recess 72 of the latch 32 is ridden over and onto the end 75 of the catch plate 30. In this manner the vertical surface 70 of the catch 32 bears against the vertical end surface 75 of the catch plate 30 as shown in FIG. 2.

To act as a load bearing surface and therefore to support a majority of the weight of the cabin panel 16 when the cabin panel is in the engaged position, the rear brace 58 of the bracket includes a lower support flange 80 (FIG. 3) which extends generally horizontally outward from the lower end of the rear brace. When the catch 32 is in the engaged position (FIG. 2), the lower surface of the support 80 rests upon an upper surface of a complementary shaped support flange 82 which extends generally horizontally inward from the catch plate 30 at a location above the upper end of the kick panel 14. As shown in FIGS. 4 and 5, as catch 32 rides upwardly over the lower straight portion of the catch plate 30, the outer end of the panel support flange 80 is horizontally separated from the inner end of the catch support flange 82. However, once the support flange 80 is above the flange 82, the movement of catch 32 along the curved riding surface 74 causes the panel flange 80 to be positioned outward and on top of the catch support flange 82. In this engaged position where the majority of the weight of the cabin panel 16 is supported by catch flange 82, the panel is held in place by the engagement of the catch 32 with the catch plate 30; the inward force generated by the tensioned cabin panel holding the latch 32 against the catch plate 30.

To disengage the cabin panel 16 from the aircraft, there is provided lower access holes 88 (FIG. 1) which extend through the cabin panel 16 and rear brace 58 at their lower ends, to locations behind a release flange 89 (FIG. 3) which extends downwardly from latch nose 66. An elongated release pin 90 is provided to be manually inserted outwardly through the access holes 88 and to engage the release flange 89. This causes the catch 32 to rotate in a clockwise direction against the bias of the spring 78 and away from the catch plate 30. Once the catch 32 is disengaged, the panel 16 is simply removed from the retaining slot 19.

Figure 9:
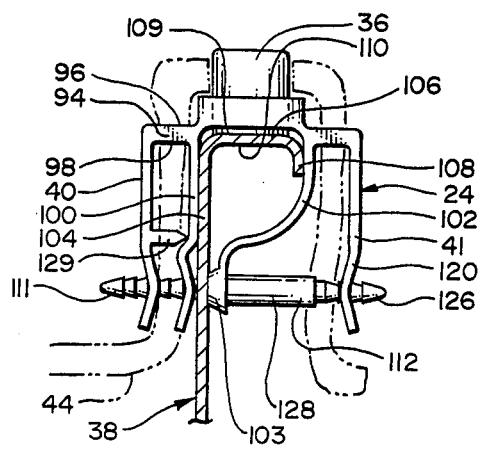
FIG. 9 is a top view of the insulation fastener and shock absorber mounted to a conventional vertically extending rib of the aircraft frame.

As discussed previously, the mounting assembly of the present invention includes a shock absorbing and insulation mounting assembly 24 which is fastened to a number of the vertical ribs of the aircraft frame (FIG. 9). As was also mentioned, it is not only desirable to mount the insulation between the frame of the aircraft and the cabin panels, but also desirable to provide shock mounts between the cabin panels and frame to reduce vibration of the cabin panels. In the present invention, the assembly 24 includes a main support cross member 94, having an inward surface 96 and outward surface 98. In order to secure the assembly 24 to the vertical rib 38, left, right flexible mounting straps 100, 102, respectively, extend in a parallel manner from outward surface 98; the right mounting strap 102 terminating in a conical shoulder guard 103. The vertical rib 38 has a conventional "J" shaped cross-sectional configuration including a main support portion 104 (only a portion of which is shown) which extends in a transverse direction to the aircraft and which terminates at an end portion 106 which extends lengthwise to the aircraft. End portion 106 terminates at a short outwardly extending tip portion 108 and thereby completes the "J" shaped configuration of the vertical rib. The rib 38 includes an outer surface 109 and an inner surface 110.

To secure assembly 24 to the rib 38, the mounting straps 100, 102, respectively, engage the inward surfaces of the rib portions 104, 108, respectively. Furthermore, mounted to the outward end of the mounting strap 102 are left and right mounting studs 111, 112 which extend in opposing directions from the conical guard 103. The mounting stud 111 is configured to be placed through a conventionally located transversely extending hole (not shown) in the rib main portion 104 so that the conical guard 103 is engaged within the hole and against the rib 38, and an end portion of the left stud 111 extends through the rib main portion 104. The left mounting strap 100 is then secured over the left stud 111. In this manner the rib main portion 104 is sandwiched between the left mounting strap 100, which lies adjacent to the outer surface 109 of the rib main portion, and the end of the guard 103. In this position, the right mounting strap 102 bends around the tip 108 of the vertical rib to secure and center the assembly main cross member 94 on the rib end portion 106.

In order to provide vibration damping, the elastomeric plug 36 is connected to the main cross member 94 of the mounting assembly and extends therefrom in an inward direction to engage the cabin panel 16, and an outward transverse direction to engage the outer surface 109 of the rib end portion 106. It should be appreciated that the bending of the cabin panel when being moved from the disengaged to the engaged position, causes the cabin panel 16 to snuggly engage the elastomeric plug 16 to prevent any vibration of the cabin panel against the plug, and to space the panel 16 from the aircraft rib 38.

The insulation mounting function of the assembly 24 is achieved by left, right flexible insulation mounting straps 40, 41, respectively (FIGS. 8 and 9), which extend outwardly from main cross member 94 generally parallel to the rib mounting straps 100, 102, respectively. Insulation 44 is inserted over and onto the studs 111, 112 of the assembly 24. The cabin insulation conventionally extends lengthwise to the cabin frame until reaching a vertical rib 38, where the insulation extends transversely to the cabin and around the rib and then back outwardly to a location where it again extends lengthwise along the cabin. To secure the insulation as it extends around the rib 38, the insulation is inserted over the right mounting stud 111 between the right mounting strap 102 and the right insulation strap 41. The insulation is then retained on the right mounting stud by inserting the right insulation strap 41 over the stud 111.

The insulation extends around the main support cross member 94 and then transversely to the cabin where it is inserted over the left mounting stud 111 between the left insulation strap 40 and the mounting strap 100. A hole 124 of the left insulation strap 40 is then inserted over the end of the left stud 111 to secure the insulation to the stud.

In order to retain its sound insulating properties, it is important not to compress the insulation when it is mounted to the aircraft. This is achieved in the present invention by the right mounting stud 112 which includes a narrow end portion 126 and a wider base portion 128. The hole 122 of the right insulation strap 41 is sized to fit over the end portion 126 but not over the base portion 128. This prevents the right insulation strap 41 and insulation 44 from being compressed against the right mounting strap 102. Furthermore, the base portion 126 has a lengthwise dimension which spaces the insulation from the rib main portion 104 so that the insulation extends around rib 38 in a U-shaped configuration.

Compression of the insulation 44 between the left mounting strap 100 and left insulation strap 40 is prevented by a spacer pin 129 which extends in a lengthwise direction from the insulation strap 40 and engages the mounting strap 100. In this manner, the spacer pin 129 maintains the position of the left insulation strap 40 which is generally parallel to left mounting strap 100.

The fastening of the insulation and mounting straps to the studs 111, 112 is achieved by the serrated configurations of the end portions of the studs. These serrated end portions are formed by a number of conically shaped ridges which are located along the lengthwise axis of the studs and which flare in a radially outward direction from the studs. In this manner, the insertion of the insulation onto these studs is facilitated by the serrated configuration, however, the radial ridge portions prevent the unwanted removable of the straps and insulation from the studs.

The mounting assembly of the present invention operates to secure the cabin panels and insulation to the aircraft in the following manner. The shock absorbing insulation mounting assembly 24 is attached to the vertical rib 38 by placing the mounting straps 100, 102 around the "J" shaped portion of the rib 38 and inserting the left stud 111 into the prelocated hole in the rib main portion 104. The stud 111 is inserted through the prelocated hole until the conical shoulder 103 of the stud engages the main portion 104. During this insertion, the right mounting strap 102 is bent around the tip 108 of the vertical rib. The insulation 44 is then routed around the rib and inserted onto the studs 111, 112, and the insulation straps 40, 41 are inserted over the corresponding studs. The cabin panels 16 are then installed in the manner described previously.

Figure 7:
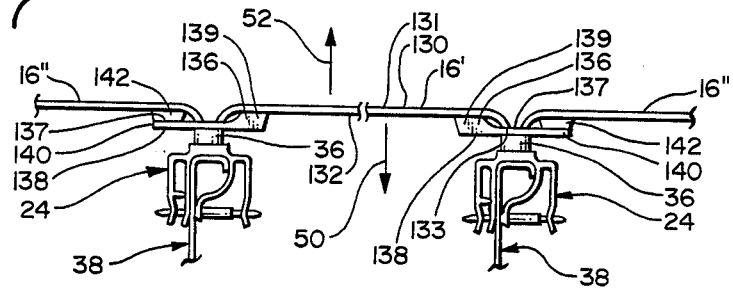
FIG. 7 is a top view showing the overlapping positions of the aircraft panels of an exemplary embodiment of the present invention.
Figure 10:
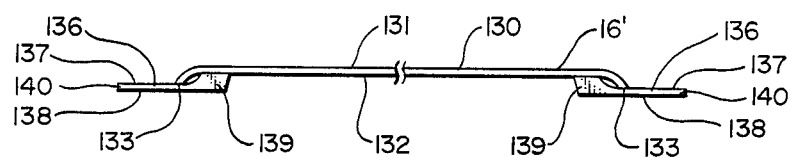
FIGS. 10A and 10B are top views showing the aircraft panels of FIG. 7.
Figure 10:
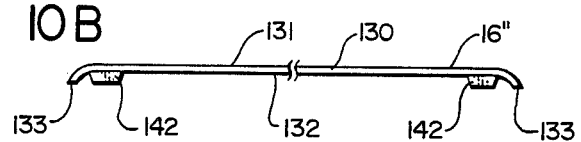

As shown in FIG. 7, the installation of the cabin panels 16 are facilitated without the use of conventional vertical trim described previously. This is achieved by utilizing alternating cabin panels having configurations shown in FIGS. 10A and 10B. These alternating panels include a first configuration 16' (FIG. 10A) in which the panel includes a main lengthwise extending portion 130, having an inward surface 131 which defines a portion of the cabin interior, and an outward surface 132. The main portion 130 terminates with left, right vertically extending 90° curved ends at edges 133. Attached to the edges 133 and to the outward surface 132 of the main portion 130 are trim strips 136, each of which has an inward surface 137 and an outward surface 138. A trim strip 136 extends vertically along each edge 133 and includes a base 139 which is bonded to the main portion 130, and an end portion 140 which extends in a direction lengthwise to the aircraft beyond the edge 133. Alternating with the panel 16' is a panel 16" (FIG. 10B) which is identical to the panel 16', however it lacks the trim strip 136. When installed, utilizing the mounting assembly of the present invention, the outward surfaces 138 of the trim strips 136 engage the elastomeric cushions 36 midway between the base 139 and the end of the end portion 140 as shown in FIG. 7. Furthermore, the edges 133 of the panels 16" engage the inward surfaces 137 of the trim strip end portions 140. In this manner, the interior of the cabin is defined by the inward surfaces of the panels 16', 16", as well as by the inward surface 137 of the trim strip 136. There is no need, however, for the conventional vertical trim strips described previously for covering the conventional mounting assemblies. This is because in the present invention the mounting assembly is located behind the cabin panel 16 and is not observable from the aircraft cabin.

It should be appreciated that the trim strips 136 also serve as vertical stiffeners for the cabin panel 16'. To provide the cabin panels 16" with a similar resiliency to that of panels 16', vertical edge stiffeners 142 (FIG. 10B) are bonded to the outward surface 132 of the main portion 130 of cabin panel 16" near each edge 133. In this manner, cabin panels 16', 16" have similar resilient characteristics when placed in the engaged position shown in FIG. 2.

What is claimed is:

1. In an aircraft having an upper structural portion and a lower structural portion, and further having resiliently bendable cabin panels, each of which has an upper end portion and a lower end portion and which occupies a first untensioned state which forms a first distance between the upper end portion and the lower end portion, and a second bended tensioned state in which the distance between the upper end portion and the lower end portion is less than the first distance, apparatus for mounting the cabin panel to the upper and lower aircraft structural portions, said apparatus comprising:
 a. upper retaining means, which are connected to said upper structural portion, and which releaseably secure the upper end portion of said cabin panel to said uppe structural portion; and
 b. lower retaining means for releaseably securing the lower end portion of said cabin panel to the lower structural portion, said lower retaining means including, (1) engaging means which care operatively connected to said aircraft lower structural portion and which are separated from said upper retaining means by a second distance, and (2) latch means, which are operatively connected to the lower end of said cabin panel at a third distance, which is greater than said second distance, from the upper end of said cabin panel for movement between (i) a first position where said latch means are disengaged from said engaging means and said cabin panel is in said untensioned state, and (ii) a second position where said latch means are engaged to said engaging means and said cabin panel has formed said bended tensioned state so as to be resiliently engaged between said upper retaining means and said engaging means.

2. The apparatus as set forth in claim 1 wherein said upper retaining means includes a slotted receptacle for receiving the upper end portion of said cabin panel therein.

3. The apparatus as set forth in claim 1 wherein:
a. said engaging means includes a latching surface for engaging said latch means; and
b. said latch means is (i) pivotally connected to the lower end of said cabin panel and (ii) biased in a manner to urge said latch means into engagement with said latching surface.

4. The apparatus as set forth in claim 3 wherein:
a. said latch means includes a catch portion for engaging said latching surface in said engaged position; and
b. said latching surface includes an upwardly extending portion, which terminates in an engaging end and which guides said catch portion upwardly and into engagement with said engaging end in a manner to cause said cabin panel lower portion to move upwardly toward said cabin panel upper portion so that said cabin panel forms said bended tensioned state.

5. The apparatus as set forth in claim 4 wherein:
a. said engaging end has a substantial vertical alignment component in order to engage a complementary surface of said catch portion so as to restrict resilient movement of said cabin panel lower portion in a first substantially horizontal direction from said engaging means;
b. said engaging means includes a first support member having a substantial horizontal alignment component;
c. said cabin panel lower portion includes a second support member which has a substantial horizontal alignment component and which engages said first support member when said cabin panel is in said bended tensioned state in a manner that said second support member is supported on said first support member so as to support said cabin panel in a substantially vertical direction.

6. The apparatus as set forth in claim 5 wherein said upwardly extending portion curves in a second horizontal direction which is generally opposite to said first horizontal direction so as to cause said second support member to be moved upwardly and on top of said first support member and said catch portion to be moved upwardly and in said second horizontal direction and into engagement with said engaging end.

7. The apparatus as set forth in claim 6 wherein:

a. said catch portion includes a downwardly extending release flange;
b. said cabin panel includes an access hole therethrough for receiving a release pin to engage to said release flange and to cause said catch portion to pivot against said engaging bias and to disengage said catch portion from said engaging end.

8. The apparatus as set forth in claim 1 additionally comprising means for securing insulation material between said cabin panel and an aircraft structural member which is characterized by having a first structural portion with a first substantial alignment component and a second structural portion which extends from an end of said first structural portion and which has a substantial alignment component which is perpendicular to said first alignment component, said securing means including (1) a base having a third substantial alignment component, (2) first and second connecting members which extend from said base and each of which has a fourth substantial alignment component which is perpendicular to said third alignment component, and (3) an elongated member which extends from said first connecting member and which has a substantial alignment component which is parallel to said third alignment component, said elongated member including (i) a first end which extends through said aircraft first structural portion and is secured to said first structural portion by said second connecting member which engages said first end, in a manner that said base is located adjacent to said second structural portion, said first end securing a first portion of said insulation material thereon, and (ii) a second end for securing a second portion of said insulation material thereon in a manner that said insulation material extends adjacent to said base and between said first and second ends of said elongated member.

9. The apparatus as set forth in claim 8 wherein said securing means includes (1) a first insulation material retaining member which extends from said base and which has a substantial alignment component which is perpendicular to said third alignnment component, said first retaining member is releasably connected to said second end of said elongated member to secure said second portion of said insulation material to said second end between said first connecting member and said first insulation retaining member, and (2) a second insulation material retaining member which extends from said base and which has a substantial alignment component which is perpendicular to said third alignment component, said second retaining member is releaseably connected to said first end of said elongated member to secure said first portion of said insulation material to said first end between said second connecting member and said second retaining member.

10. The apparatus as set forth in claim 1 wherein said securing means includes vibration dampening means which are connected to and extend from opposite sides of said base to engage said second structural portion and said cabin panel in order to prevent vibration of said cabin panel.

11. The apparatus as set forth in claim 10 wherein said vibration dampening means is an elastomeric member which has a substantial alignment component which is perpendicular to said third alignment component.

12. The apparatus as set forth in claim 9 wherein:
   a. said insulation material second portion is secured to said second end between said first connecting member and said first retaining member in a manner that said material second portion has a substantial alignment component which is parallel to said first alignment component;
   b. said second end of said elongated member includes (i) a first axial portion to which said material second portion is secured, and (ii) a second axial portion which extends between said first axial portion and said first end of said elongated member, said second axial portion having a greater thickness dimension than said first axial portion so that said material second portion is secured between said second axial portion and said first retaining member, said second axial portion having a longitudinal dimension which positions said material second portion from said first structural portion in a manner that said material second portion has a substantial alignment component which is parallel to said first alignment component.

13. In an aircraft having an upper structural portion and a lower structural portion, an aircraft interior panel network comprising:
   a. a plurality of resiliently bendable aircraft interior panels each of which has an upper end portion and a lower end portion and which occupies a first untensioned state which forms a first distance between the upper end portion and the lower end portion, and a second bended tensioned state in which the distance between the upper end portion and the lower end portion is less than the first distance; and
   b. means for mounting each of said cabin panels to the upper and lower aircraft structural portions, including
      (1) upper retaining means which are operatively connected to said upper structural portion, and which releaseably secure the upper end portion of said cabin panel to said upper structural portion, and
      (2) lower retaining means for releaseably securing the lower end portion of said cabin panel to said lower structural portion, said lower retaining means including
         (i) engaging means which are operatively connected to said lower structural portion and which are separated from said upper retaining means by a second distance, and
         (ii) latch means which are operatively connected to the lower end of said cabin panel at a third distance from said upper end of said cabin panel which is greater than said second distance, for movement between a
            (a) a first position where said latch means are disengaged from said engaging means and said cabin panel is in said untensioned state, and
            (b) a second position where said latch means are engaged to said engaging means and said cabin panel has formed said bended tensioned state so as to be resiliently engaged between said upper retaining means and said engaging means.

14. The aircraft interior panel network as set forth in claim 13 wherein:
   a. said aircraft interior panels include a first group in which each panel of said first group includes (i) a first upstanding planar portion having a first substantial alignment component and which has an interior surface which forms a portion of the cabin interior and which terminates at first and second spaced apart upstanding edges, (ii) first and second intermediate portions, each of which has a second substantial alignment component which is perpendicular to said first alignment component and which are connected to said first and second upstanding edges, respectively, and (iii) first and second upstanding end portions which are connected to said first and second intermediate portions, respectively, and each of which has a substantial alignment component which is parallel to said first alignment component and which have an interior surface which also forms a portion of the cabin interior;
   b. said aircraft interior panels include a second group in which each panel of said second group includes (i) a third upstanding planar portion having an alignment component which is parallel to said first alignment component and which has an interior surface which forms a portion of the cabin interior and which terminates at third and fourth upstanding edges, and (ii) third and fourth intermediate portions each of which has a substantial alignment component which is parallel to said second alignment component and which is connected to said first and second upstanding edges, respectively, and which terminates at fifth and sixth upstanding edges, respectively; and
   c. said cabin interior being formed by said securing of said panels to said aircraft structure in a manner that one of said panels of said first group is alternated with one of said panels of said second group so that said fifth edge of said panel of said second group is in engagement with said interior surface of said second end portion of said panel of said first group, and said sixth edge of said panel of said second group is in engagement with said interior surface of said first end portion of said panel of said first group.

15. In an aircraft having a cabin panel and an aircraft structural member which is characterized by having a first structural portion with a first substantial alignment component and a second structural portion which extends from an end of said first structural portion and which has a substantial alignment component which is perpendicular to said first alignment component, an apparatus for securing insulation material between said cabin panel and said aircraft structural member, said apparatus comprising:
   a. a base having a first substantial alignment component;
   b. first and second connecting members which extend from said base and each of which has a second substantial alignment component which is perpendicular to said first alignment component; and
   c. an elongated member which extends from said first connecting member and which has a substantial alignment component which is parallel to said first alignment component, said elongated member including (i) a first end which is adapted to extend through said first structural portion and to be secured to said first structural portion by said second connecting member which engages said first end in a manner that said base is located adjacent to said second structural portion, said first end being further adapted to secure a first portion of said insulation material thereon, and (ii) a second end for securing a second portion of said material thereon in a manner that said insulation material extends adjacent to said base and between said first and second ends of said elongated member.

16. The apparatus as set forth in claim 15 wherein said securing means includes
   (1) a first insulation material retaining member which extends from said base and which has a substantial alignment component which is perpendicular to said third alignnment component, said first retaining member being adapted to be releasebly connected to said second end of said elongated member to secure said second portion of said insulation material to said second end between said first connecting member and said first insulation retaining member, and
   (2) a second material retaining member which extends from said base and which has a substantial alignment component which is perpendicular to said third alignment component, said second retaining member being adapted to be releaseably connected to said first end of said elongated member to secure said first portion of said insulation material to said first end between said second connecting member and said second retaining member.

17. The apparatus as set forth in claim 16 wherein said securing means includes vibration dampening means which are connected to and extend from opposite sides of said base to engage said second structural portion and said cabin panel in order to reduce vibration of said cabin panel.

18. The apparatus as set forth in claim 17 wherein said vibration dampening means is an elastomeric member which extends through said base.

19. The apparatus as set forth in claim 18 wherein:
   a. said insulation material second portion is secured to said second end between said first connecting member and said first retaining member in a manner that said material second portion has a substantial alignment component which is parallel to said first alignment component; and
   b. said second end of said elongated member includes (i) a first axial portion to which said material second portion is secured, and (ii) a second axial portion which extends between said first axial portion and said first end of said elongated member, said second axial portion having a greater thickness dimension than said first axial portion so that said material second portion is secured between said second axial portion and said first retaining member, said second axial portion having a longitudinal dimension which positions said material second portion from said first structural portion in a manner that said material second portion has a substantial alignment component which is parallel to said first alignment component.

20. In an aircraft having an upper structure portion and a lower structural portion which are separated by a first vertical distance, and further having resiliently bendable cabin panel, each of which has an upper end portion and a lower end portion and which occupies a first untensioned state which forms a second vertical distance between the upper end portion and the lower end portion, and a second bended tensioned state in which the vertical distance between the upper end portion and the lower end portion is less than the first distance, a method of engaging the aircraft cabin panels to the aircraft comprising the steps of:
   a. releasably securing the upper end portion of the cabin panel to the upper structural portion; and
   b. releasably securing the lower end portion of the cabin panel to the lower structural portion of the aircraft by moving the lower end of the cabin panel from a first portion where the lower end is disengaged from the lower structural portion and the cabin panel is in the untensioned state, to a second position where the lower end of the cabin panel is engaged to the lower structural portion by moving the lower end portion of the cabin panel upwardly toward the upper end portion so that the distance between the upper end portion and the lower end portion is less than said second distance to form the cabin panel in the bended tensioned state so as to resililently engage the cabin panel between the upper structural portion and the lower structural portion, said method being characterized in that:
   1. during the securing of the upper end portion, the upper end portion of the cabin panel is inserted in a slotted receptacle of the upper structural portion, and
   2. during the securing of the lower end portion, the lower end portion is releasably secured to the lower structural portion by latching a catch which is pivotally connected to the panel lower portion to a catch plate which is connected to the lower structural portion.

* * * * *